(12) United States Patent
Schlipf et al.

(10) Patent No.: US 12,330,785 B2
(45) Date of Patent: Jun. 17, 2025

(54) AIRCRAFT FLAP SYSTEM

(71) Applicant: Airbus Operations GmbH, Hamburg (DE)

(72) Inventors: Bernhard Schlipf, Hamburg (DE); Christoph Winkelmann, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 18/396,967

(22) Filed: Dec. 27, 2023

(65) Prior Publication Data

US 2024/0217648 A1    Jul. 4, 2024

(30) Foreign Application Priority Data

Dec. 30, 2022    (EP) .................................... 22217421

(51) Int. Cl.
*B64C 9/02*    (2006.01)
*B64C 9/18*    (2006.01)
*B64D 37/04*    (2006.01)

(52) U.S. Cl.
CPC .................. *B64C 9/02* (2013.01); *B64C 9/18* (2013.01); *B64D 37/04* (2013.01)

(58) Field of Classification Search
CPC .... B64C 9/02; B64C 9/18; B64C 9/20; B64D 37/04
See application file for complete search history.

(56) References Cited

U.S. PATENT DOCUMENTS

| 4,441,675 | A | 4/1984 | Boehringer | |
|---|---|---|---|---|
| 4,789,119 | A | 12/1988 | Bellego | |
| 6,224,022 | B1 | 5/2001 | Barba | |
| 2019/0023378 | A1* | 1/2019 | Miller | B64C 13/34 |
| 2022/0371743 | A1* | 11/2022 | Allain | B64D 37/30 |
| 2024/0308681 | A1* | 9/2024 | Vincekovic | B64D 1/12 |

OTHER PUBLICATIONS

European Search Report for Application 22217421 dated May 30, 2023.

* cited by examiner

*Primary Examiner* — Rodney A Bonnette
(74) *Attorney, Agent, or Firm* — KDW Firm PLLC

(57) ABSTRACT

An aircraft wing including a flap system mounted at a leading or trailing edge of the wing and includes at least two movable flap devices spaced apart in a spanwise direction Y from each other, each movable flap device supported by at least one support station and driven about a hinge axis by at least one drive system. The flap system includes a synchronizing torque element connected to the movable flap devices, wherein the synchronizing torque element is configured to transmit a torque between the movable flap devices to actuate a rotational movement of the movable flap devices, and wherein the synchronizing torque element is positioned between the movable flap devices and around an adjacent system or structural component that is also positioned between the movable flap devices.

5 Claims, 3 Drawing Sheets

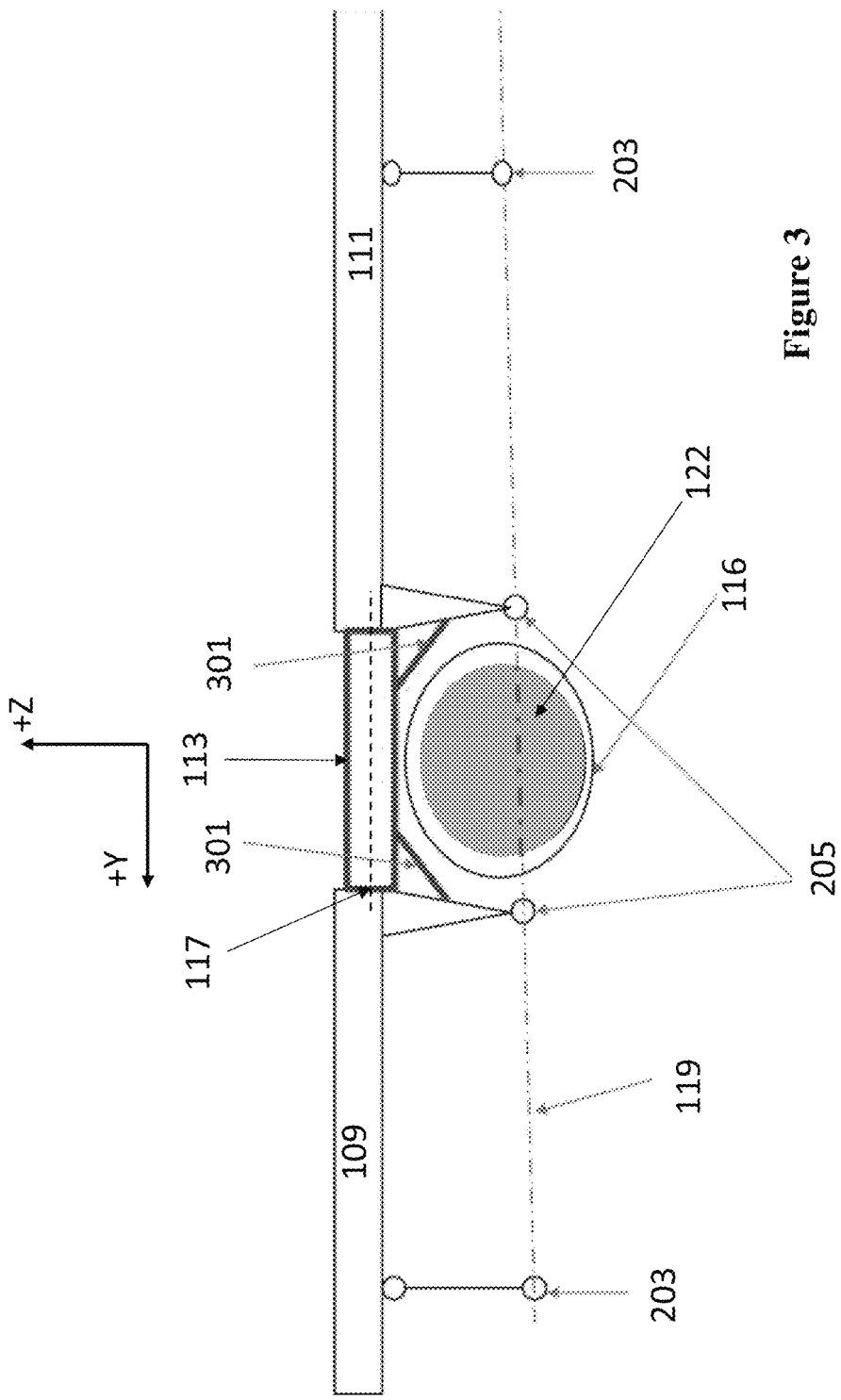

AIRCRAFT FLAP SYSTEM

TECHNICAL FIELD

The disclosure herein relates to a flap system for a wing of an aircraft, an aircraft wing and an aircraft.

BACKGROUND

Aircraft and in particular commercial aircraft typically comprise various high lift control surfaces as part of their wings or mounted on the wings. The control surfaces or control devices usually comprise leading edge devices such as slats positioned at the leading edge of a wing and trailing edge devices positioned at the trailing edge of the wing. Trailing edge devices may comprise e.g. flaps, or flaperons and others, each having a specific function and influencing the aerodynamic behaviour and performance of the aircraft. It is important that symmetric deployment of such devices is achieved so that the aircraft remains controllable and stable as the devices are retracted and deployed to the required positions during flight.

In order to ensure sufficient redundancy in the design so that the devices may be moved in a synchronized way, multiple drive system interfaces per trailing edge device are necessary. So, in the example case of an aircraft with two flaps you might see four drive systems interfaces being used to ensure redundancy (2 per flap) for synchronized movement. Normally these drive interfaces are placed within the wing outer surface on each wing either side of a pressurized or unpressurized fuselage or alternatively either side of an engine pylon or high lift assembly on a wing.

Another approach to satisfying sufficient synchronization redundancy is to provide one drive interface per flap and an interconnector device such as a torque rod or torque element that connects between the flaps such that in the case of failure of one drive interface, the interconnector device enables both flaps to be driven in a synchronized way to the desired position using a single drive interface at one of the flaps. A limitation to such an arrangement is the positioning of the independent interconnector between flaps through an adjacent component located between the flaps, such as the pylon, or fuselage, or high lift component. This in some cases is not possible as the adjacent component may categorized as a "keep out zone" where such devices are not possible or permitted to pass through. Such a zone may be classified as a "keep out zone" because of space allocation, or due to the fact that the adjacent component being pressurised or containing system components that cannot be repositioned for example an accumulator or engine or a fuel tank.

SUMMARY

It may be seen as an object of the disclosure herein to provide a trailing edge system for an aircraft that enables the use of an interconnector device while still meeting the requirement for respecting "keep out zones".

The abovementioned object may be achieved by the trailing edge system disclosed herein. Further advantageous features are disclosed herein.

An aircraft wing is provided comprising a flap system that is mounted at a leading or trailing edge of the wing. The flap system comprises at least two movable flap devices spaced apart in a spanwise direction Y from each other. Each movable flap device is supported by at least one support stations and driven about a hinge axis by at least one drive system. The flap system further comprises a synchronizing torque element connected to the movable flap devices. The synchronizing torque element is configured to transmit a torque between the movable flap devices in order to actuate a rotational movement of the movable flap devices. The synchronizing torque element is positioned between the movable flap devices and around an adjacent system or structural component that is also positioned between the movable flap devices.

The design as described enables the use of an interconnector device while still meeting the requirement for respecting "keep out zones".

Preferably the synchronizing torque element comprises an axis of rotation that is parallel and eccentric to a hinge line of the movable flap devices. This results in symmetric a design that considers uniform loading across the torque element during operation and accounts for the primary loading being in torque.

Preferably, the synchronizing torque element is connected to one or more of movable flap devices using universal joint(s). The use of a universal joint is advantageous in that it ensure optimal performance of the system being achieved during asymmetrical loading events, e.g gust or cases of asymmetric wing bending. Use at one end of the synchronizing torque element is possible if the torque element has sufficient strength to react bending loads at the opposite attachment end to the opposite flap. If so, such an arrangement is less complex and cheaper to manufacture.

Preferably the synchronizing torque element is supported by a plurality of side stay struts that are each connected to a corresponding flap master support. Such a design is advantageous in that the support principle of the torque element is simplified by avoiding the need for separate support fittings which adds weight and complexity to the overall wing design and would occupy valuable space. Also, use is made of existing master support stations and allows for spanwise loads to be transferred between adjacent devices via the synchronizing torque element, thereby reducing weight and complexity.

Preferably, the disclosure herein may be applied to aircraft where the system component is an aircraft pylon containing a H2 storage tank or power plant. Such arrangement is particularly suited in such an arrangement to relieve space allocation requirements.

BRIEF DESCRIPTION OF THE DRAWINGS

Embodiments are presented herein are described below with reference to the following drawings, in which:

FIG. 3 is a combined rear and section view of an embodiment of the aircraft wing, flap system and propulsion unit arrangement of FIGS. 1 and 2. The section is taken through an aft portion of a propulsion unit through a parallel plane to plane ZY.

DETAILED DESCRIPTION

With reference to all figures, in a typical coordinate convention appreciated by the skilled person, the X, Y and Z axes correspond to a set of orthogonal aircraft axes, whereby X is the longitudinal aircraft axis, Y corresponds to the lateral aircraft axis oriented in a spanwise direction of the wing of the aircraft, and the direction Z corresponds to the vertical axis, these three directions being orthogonal to each other, and create a set of three orthogonal planes with respect to each other. It should also be noted that typically the freestream direction S is approximately co-linear with the airplane X axis when the aircraft is in steady and level flight.

Figure 1:
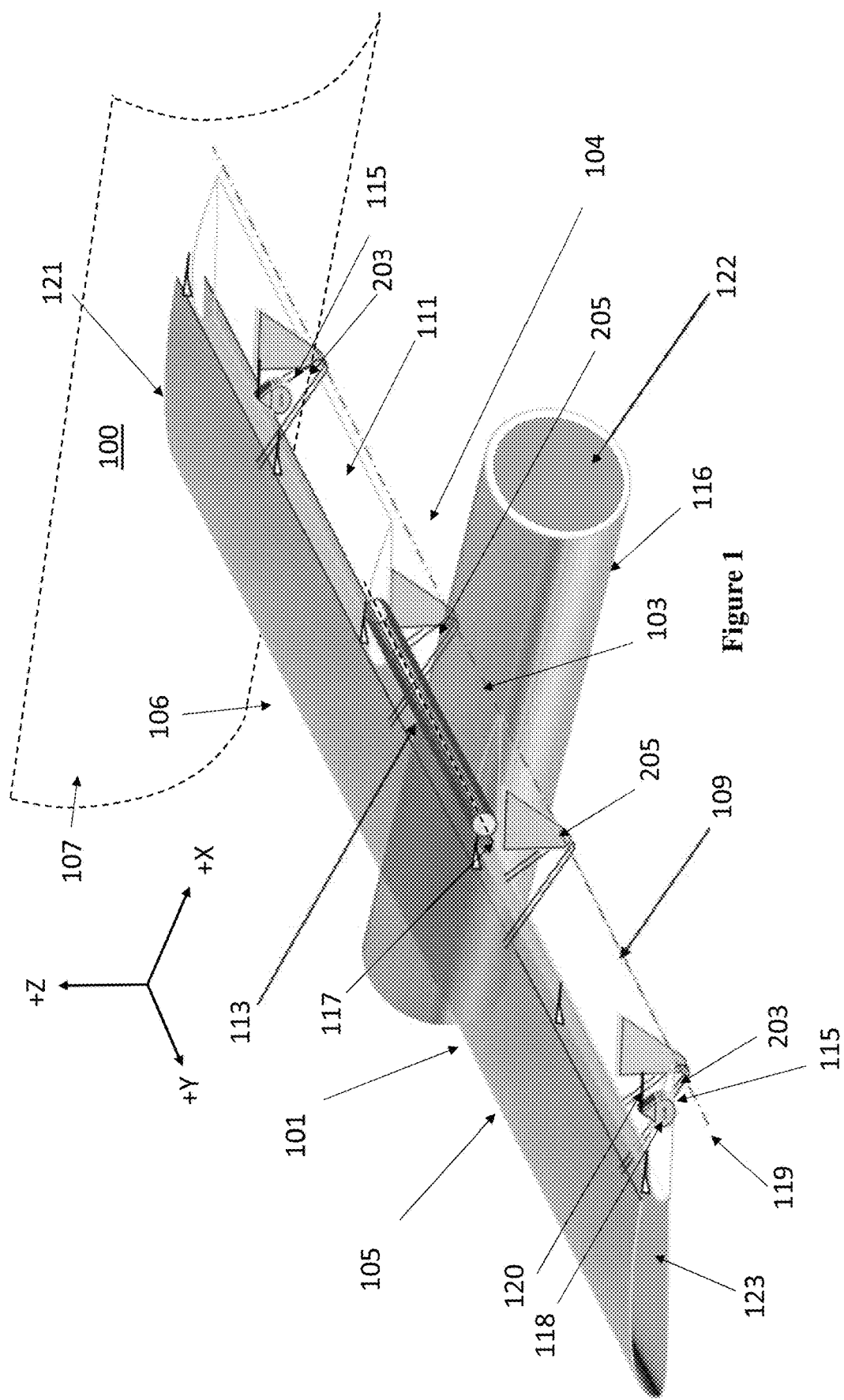
FIG. 1 is a combined isometric view and section view of an aircraft, a fuselage and a wing attached to the fuselage and comprising a flap system according to an embodiment of the disclosure herein. The section is taken through an aft portion of a propulsion unit that is mounted to the wing between adjacent movable trailing edge flaps.
Figure 2:
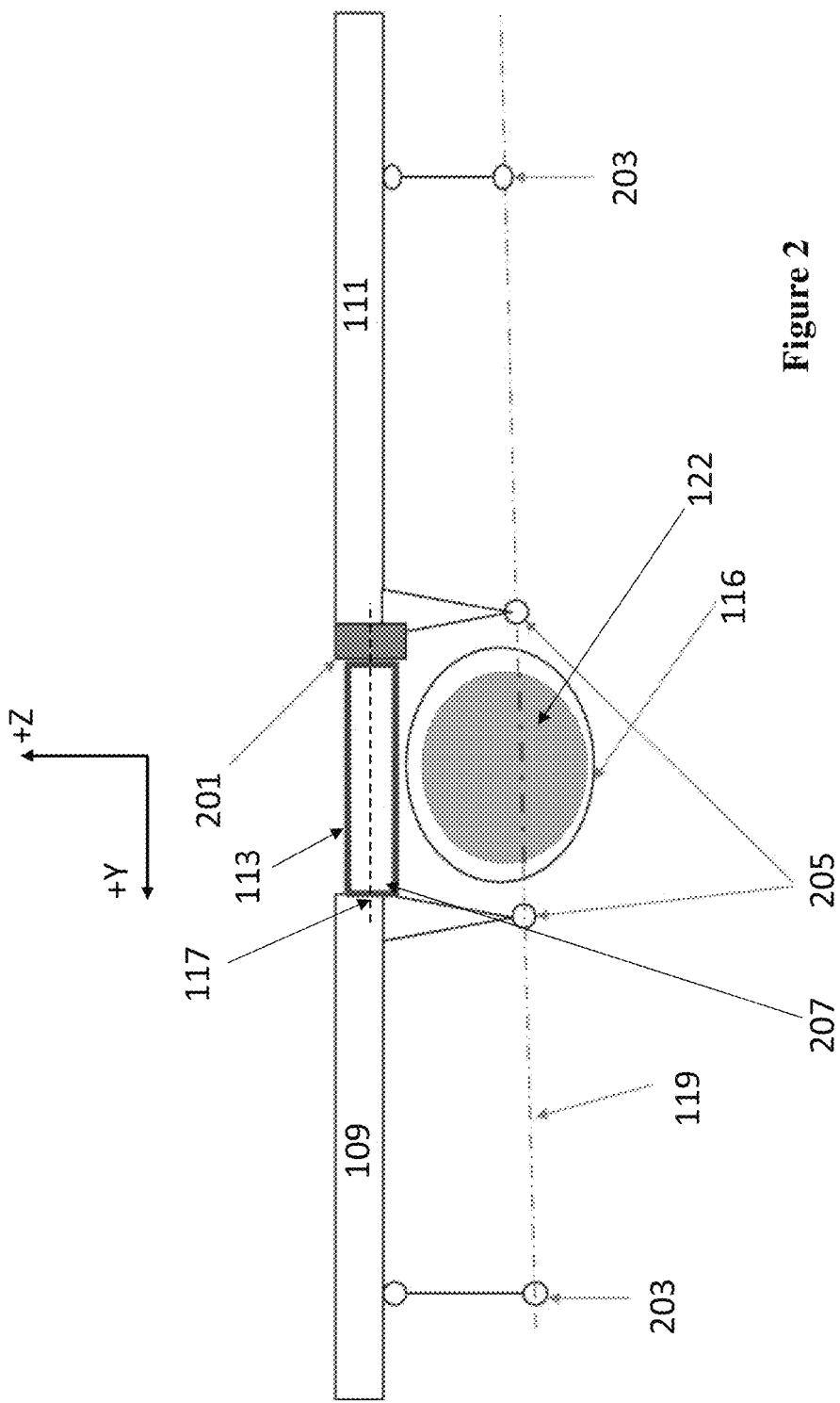
FIG. 2 is a combined rear and section view of the aircraft wing, flap system and propulsion unit arrangement of FIG. 1. The section is taken through an aft portion of a propulsion unit through a parallel plane to plane ZY.

FIGS. 1 and 2 shows an aircraft wing 101 mounted to a fuselage portion 107 of an aircraft 100. The wing 101 extends between a root portion 121 and a tip portion 123 in a spanwise direction Y and is provided with a flap system 103 that is mounted at a trailing edge region 104 of the wing 101. As previously mentioned, such a system 103 may be implemented at the leading edge 106 of the wing 101 if desired. The flap system 103 comprises at least two movable flap devices 109, 111 spaced apart in a spanwise direction Y from each other. Each movable flap device 109, 111 is supported by a plurality of support stations categorised as master support stations 205 and slave support stations 203. Master support stations 205 support the flap device 109, 111 in all but one degrees of freedom (a rotational DOF), whereas the slave support stations 203 permit the flaps 109, 111 to displace in an additional DOF in the spanwise Y direction. Each flap 109, 111 is driven about a hinge axis 119 by at least one drive system 115 comprising a geared rotary actuator 118 and a drive connection strut 120 that is located in the same position as the slave support station 203. The flap system 103 further comprises a synchronizing torque element 113 connected to the movable flap devices 109, 111. The synchronizing torque element 113 is configured to transmit a torque between the movable flap devices 109, 111 in order to actuate a rotational movement of the movable flap devices 109, 111 in a synchronous way about the flap hinge axis 119 when only one drive system 115 is capable of effecting movement of the flap system 103. The synchronizing torque element is positioned between the movable flap devices 109, 111 and around an adjacent H2 propulsion unit 116 which is a combined system of structural and system components and which also positioned between the movable flap devices 109, 111. The propulsion unit 116 comprises a "keep out zone" 122, through which components not associated with the operation of the propulsion unit 116 may not pass. The synchronizing torque element 113 comprises an axis of rotation 117 that is parallel and offset or eccentric to a hinge line 119 of the movable flap devices 109, 111, as shown.

As can be seen in FIG. 2, the synchronizing torque element 113 is connected to at least one movable flap device 109, 111 using a universal joint 201. Use of at one end of the synchronizing torque element 113 is possible if the torque element 113 has sufficient strength to react bending loads at the opposite attachment end 207 to the opposing flap 109. A further universal joint 201 may additionally be implemented at end 207 of the torque element 113 should the spanwise bending loading or sizing of the torque element 113 necessitate it.

With reference to FIG. 3, an aircraft wing 101 substantially in accordance with the embodiment of FIGS. 1 and 2 is shown, wherein the synchronizing torque element 113 is supported by a plurality of side stay struts 301 that are each connected to a corresponding flap master supports 205. Each side stay strut 301 comprises a pivot type attachment at each ends to the torque element 113 and the master support station 205 so as to permit the torque element 113 to orbit the hinge axis 119 at a pre-specified distance, determined by the size of the overall flap system 103 and wing 101.

Where in the foregoing description, integers or elements are mentioned which have known, obvious or foreseeable equivalents; then such equivalents are herein incorporated as if individually set forth. Reference should be made to the claims for determining the true scope of the disclosure herein, which should be construed so as to encompass any such equivalents. It will also be appreciated by the reader that integers or features of the disclosure herein that are described as preferable, advantageous, convenient or the like are optional and do not limit the scope of the independent claims. Moreover, it is to be understood that such optional integers or features, whilst of possible benefit in some embodiments of the disclosure herein, may not be desirable, and may therefore be absent, in other embodiments.

While at least one example embodiment of the invention( ) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft wing comprising a flap system that is mounted at a leading or trailing edge of the wing and comprises
   at least two movable flap devices spaced apart in a spanwise direction Y from each other,
   wherein each movable flap device is supported by at least one support station and is driven about a hinge axis by at least one drive system,
   wherein the flap system comprises a synchronizing torque element connected to the movable flap devices,
   wherein the synchronizing torque element is supported by a plurality of side stay struts that are each connected to a corresponding flap master support,
   wherein the synchronizing torque element is configured to transmit a torque between the movable flap devices to actuate a rotational movement of the movable flap devices, and
   wherein the synchronizing torque element is positioned between the movable flap devices and around an adjacent system or structural component that is also positioned between the flap devices.

2. The aircraft wing according to claim 1, wherein the synchronizing torque element comprises an axis of rotation that is parallel and eccentric to a hinge line of the movable flap devices.

3. The aircraft wing according to claim 1, wherein the synchronizing torque element is connected to at least one movable flap device using a universal joint.

4. The aircraft wing according to claim 1, wherein the structural component is an aircraft pylon containing a H2 storage tank.

5. An aircraft comprising a wing according to claim 1.

* * * * *